United States Patent
Moore (10) Patent No.: US 7,412,430 B1
(45) Date of Patent: Aug. 12, 2008

(54) DETERMINING THE QUALITY OF COMPUTER SOFTWARE

(75) Inventor: Robert L. Moore, Montgomery, AL (US)

(73) Assignee: Electronic Data Systems Corporation, Plano, TX (US)

( * ) Notice: Subject to any disclaimer, the term of this patent is extended or adjusted under 35 U.S.C. 154(b) by 826 days.

(21) Appl. No.: 10/314,420

(22) Filed: Dec. 9, 2002

(51) Int. Cl.
*G06F 17/00* (2006.01)
*G06N 5/04* (2006.01)

(52) U.S. Cl. .................................... 706/46; 706/9

(58) Field of Classification Search ............ 706/9, 706/46; 717/101, 104
See application file for complete search history.

(56) References Cited

U.S. PATENT DOCUMENTS

| | | | | |
|---|---|---|---|---|
| 5,852,708 | A * | 12/1998 | Shyu et al. | 706/9 |
| 5,940,814 | A * | 8/1999 | Jiang et al. | 706/1 |
| 6,038,517 | A * | 3/2000 | Dobbins et al. | 702/82 |
| 6,173,440 | B1 * | 1/2001 | Darty | 717/130 |
| 6,671,874 | B1 * | 12/2003 | Passova | 717/126 |
| 6,763,337 | B1 * | 7/2004 | Verma et al. | 706/9 |
| 6,862,696 | B1 * | 3/2005 | Voas et al. | 714/38 |

OTHER PUBLICATIONS

Ali Idri, Alain Abran, Taghi Khoshgoftaar. Estimating Software Project Effor by Analogy Based on Linguistic Values. IEEE Symposium on Software Metrics. Jun. 2002.*
Ali Idri, Alain Abran, Laila Kjiri. COCOMO Cost Model Using Fuzzy Logic. Conference on Fuzzy Theory and Technology. Feb. 2000.*
Satish Kumar, Ananda Krishna, Prem Satsangi. Fuzzy Systems and Neural Networks in Software Engineering Project Management. Jornal of Applied Intelligence. 1994.*
Moore, R.L., and Ali, A., "SQA Warm-Fuzzy A New Application of Fuzzy Logic for the Measurement of Software Quality and Prediction of Future Performance," *Proceedings of the 30th International Conference on Computers and Industrial Engineering*, Tinos Island, Greece, Jun. 28-Jul. 2, 2002, pp. 635-640.

* cited by examiner

*Primary Examiner*—Joseph P. Hirl
*Assistant Examiner*—Adrian L Kennedy
(74) *Attorney, Agent, or Firm*—Fish & Richardson, P.C.

(57) ABSTRACT

Techniques are described for determining the quality of software using fuzzy logic. The techniques include using linguistic variables to translate a numeric value of a quality attribute into a linguistic value of a quality attribute. The linguistic values of multiple quality attributes are aggregated into a quality rating of the software. The quality rating then is used to predict a performance attribute for the software. Techniques are described that may help improve the accuracy of the prediction, including refining software quality parameters based on a comparison of the parameters with software quality of the developed software. The techniques also include the ability to modify the quality attributes used based on the computing environment, the organizational environment or other characteristics.

20 Claims, 7 Drawing Sheets

| IF PORTION | | | THEN PORTION | |
|---|---|---|---|---|
| Complexity Quality Attribute | Reusability Quality Attribute | Size Quality Attribute | Software Quality Rating | |
| low | low | small | high | ← 451 |
| medium | low | small | medium | ← 452 |
| high | low | small | low | ← 453 |
| low | low | medium | medium | ← 454 |
| medium | low | medium | low | ← 455 |
| high | low | medium | very_low | ← 456 |
| low | low | large | medium | ← 457 |
| medium | low | large | low | ← 458 |
| high | low | large | very_low | ← 459 |
| low | medium | small | very_high | ← 460 |
| medium | medium | small | high | ← 461 |
| high | medium | small | medium | ← 462 |
| low | medium | medium | high | ← 463 |
| medium | medium | medium | medium | ← 464 |
| high | medium | medium | low | ← 465 |
| low | medium | large | medium | ← 466 |
| medium | medium | large | low | ← 467 |
| high | medium | large | very_low | ← 468 |
| low | high | small | very_high | ← 469 |
| medium | high | small | high | ← 470 |
| high | high | small | medium | ← 471 |
| low | high | medium | high | ← 472 |
| medium | high | medium | medium | ← 473 |
| high | high | medium | medium | ← 474 |
| low | high | large | high | ← 475 |
| medium | high | large | medium | ← 476 |
| high | high | large | low | ← 477 |

DETERMINING THE QUALITY OF COMPUTER SOFTWARE

TECHNICAL FIELD

This description relates to techniques for determining the quality of computer software.

BACKGROUND

The quality of computer software may be based on the quality of the process used to develop the computer software. The quality of computer software also may be determined based on quality indicators or attributes of the computer software itself. Examples of quality attributes include reliability, reusability, maintainability, mean time to failure, testability, usability, efficiency, understandability, complexity, modularity, and portability. Many attributes, such as mean time to failure and reliability, are only measurable after the computer software is placed in operation.

SUMMARY

In one general aspect, determining the quality of computer software includes accessing numeric values. Each numeric value is associated with a software quality attribute for particular software. Each numeric value is transformed to a linguistic value. Each linguistic value is associated with the software quality attribute. The linguistic values are aggregated to determine a linguistic software quality rating.

Implementations may include one or more of the following features. For example, a numeric value may be transformed using a membership function that associates one of several linguistic values with a range of numeric values. A degree of membership may be associated with a linguistic value. A degree of support may be associated with a linguistic software quality rating based on the degree of membership. The linguistic software quality rating may be transformed to a numeric software quality rating. The transformation of the linguistic software quality rating to a numeric software quality rating may use a defuzzification technique. The linguistic software quality rating may be used to predict a performance attribute for the particular software.

The linguistic values, the linguistic software quality rating, and the performance attribute may be stored. Actual performance data for the software may be received. The actual performance data may be compared with one or more of the stored linguistic values, the linguistic software quality rating, and the performance attribute. The association of the linguistic values and the software quality attribute may be user-modifiable.

Implementations of the techniques discussed above may include a method or process, a system or apparatus, or computer software on a computer-accessible medium.

One conventional approach to determining the quality of computer software is to determine the quality of the process used to develop the computer software. The quality of the process measurement is used as a measurement of software quality based on an assumption that a software development process produces software of corresponding quality. For example, a good quality software development process tends to produce software of good quality, whereas a poor quality software development process tends to produce software of poor quality.

An alternate approach to determining the quality of software is to measure the quality of the software itself. However, measurements of the quality of the software itself are generally not possible until late in the software development process after the software has been completed. In addition, the quality attributes used as a measure for software quality may be imprecise or may not be generally agreed-upon.

The ability to determine, or predict, software quality based on the measurement of attributes of the software products developed during the software development process, even before the software has been programmed, may be beneficial. For example, the ability to predict software quality based on attributes of the software requirements or the software design may be beneficial. When the quality of the software is predicted to be lower than desirable, modifications to the design and/or requirements may be made before the software is programmed. The time and expense of programming software may be reduced by making changes earlier in the development process. This may result in decreased software costs and may result in increased software quality.

The details of one or more of the implementations are set forth in the accompanying drawings and description below. Other features will be apparent from the description and drawings, and from the claims.

DESCRIPTION OF THE DRAWINGS

Like reference symbols in the various drawings indicate like elements.

DETAILED DESCRIPTION

Techniques are described for determining the quality of software using fuzzy logic. The techniques include using linguistic variables to translate a numeric value of a quality attribute into a linguistic value of a quality attribute. The linguistic values of multiple quality attributes are aggregated into a quality rating of the software. The quality rating then is used to predict a performance attribute for the software. Techniques are described that may help improve the accuracy of the prediction, including refining software quality parameters based on a comparison of the parameters with software quality of the developed software. The techniques also include the ability to modify the quality attributes used based on the computing environment, the organizational environment or other characteristics.

Figure 1:
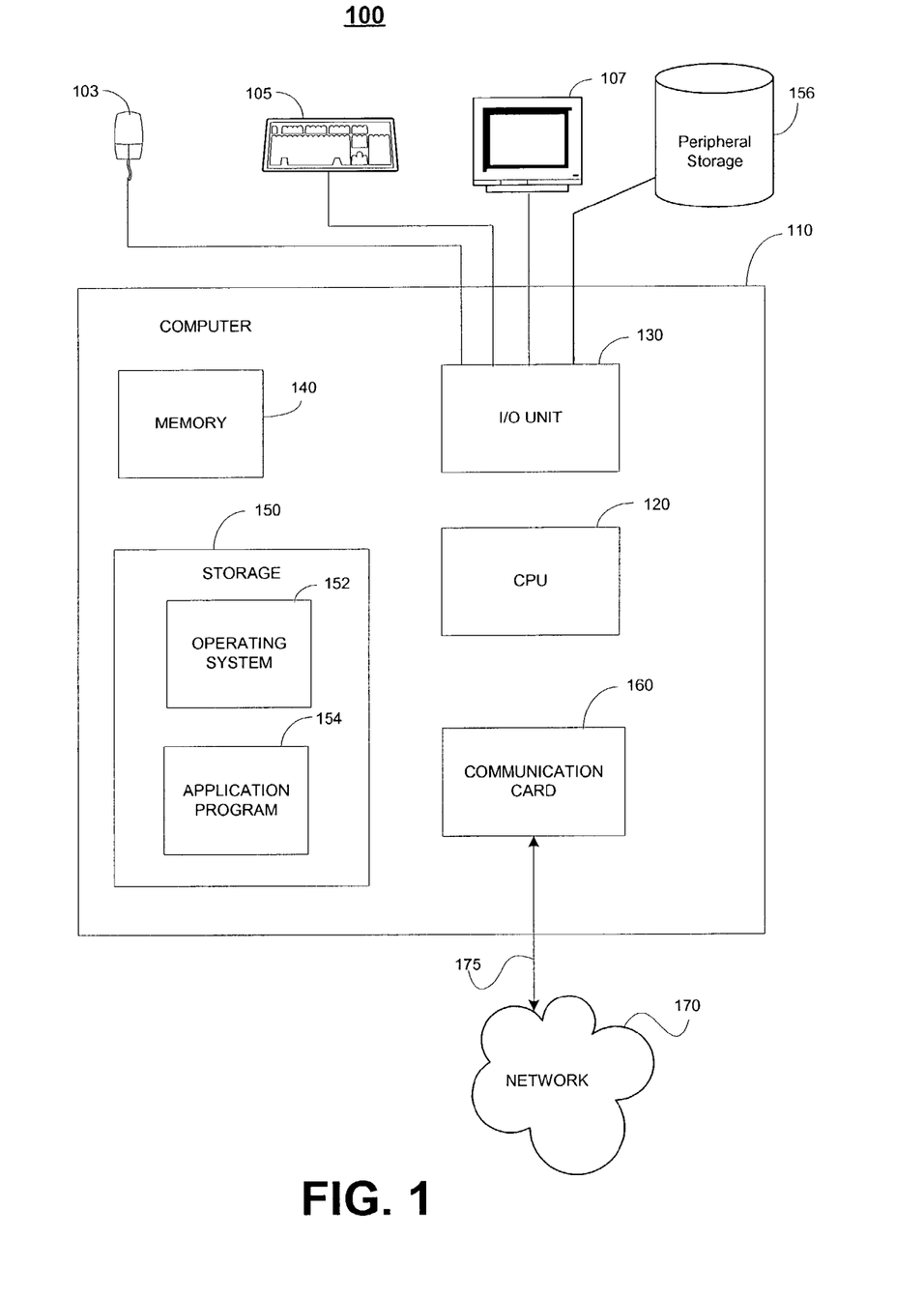
FIG. 1 is a block diagram of a system for determining the quality of software.

Referring to FIG. 1, a programmable system 100 for determining the quality of software includes a variety of input/output (I/O) devices (e.g., mouse 103, keyboard 105, and display 107) and a computer 110 having a central processor unit (CPU) 120, an I/O unit 130, a memory 140, and a data storage device 150. Data storage device 150 may store machine-executable instructions, data, and various programs such as an operating system 152 and one or more application programs 154 for implementing a process for determining the quality of software, all of which may be processed by CPU 120. The operating system 152 may include a version of the Windows operating system by Microsoft Corporation of Redmond, Wash., a version of the Unix operating system, or a version of the Linux operating system. Each computer program may be implemented in a high-level procedural or object-oriented programming language, or in assembly or machine language if desired; and, in any case, the language may be a compiled or interpreted language. Data storage device 150 may be any form of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM).

System 100 may include one or more peripheral online storage devices 156 for storing software quality data. Peripheral online storage device 156 may use any storage media (including magnetic, optical or solid state storage media) or any type of storage device (including a drive, a microdrive, a compact disc (CD), a recordable CD (CD-R), a rewriteable CD (CD-RW), a flash memory, or a solid-state floppy disk card).

System 100 also may include a communications card or device 160 (e.g., a modem and/or a network adapter) for exchanging data with a network 170 using a communications link 175 (e.g., a telephone line, a wireless network link, a wired network link, or a cable network). Examples of the network 170 include the Internet, the World Wide Web, WANs, LANs, analog or digital wired or wireless telephone networks, radio, television, cable, or satellite networks. Other examples of system 100 may include a handheld device, a workstation, a server, a device, a component, other equipment, or some combination of these capable of responding to and executing instructions in a defined manner. Any of the foregoing may be supplemented by, or incorporated in, ASICs (application-specific integrated circuits).

Figure 2:
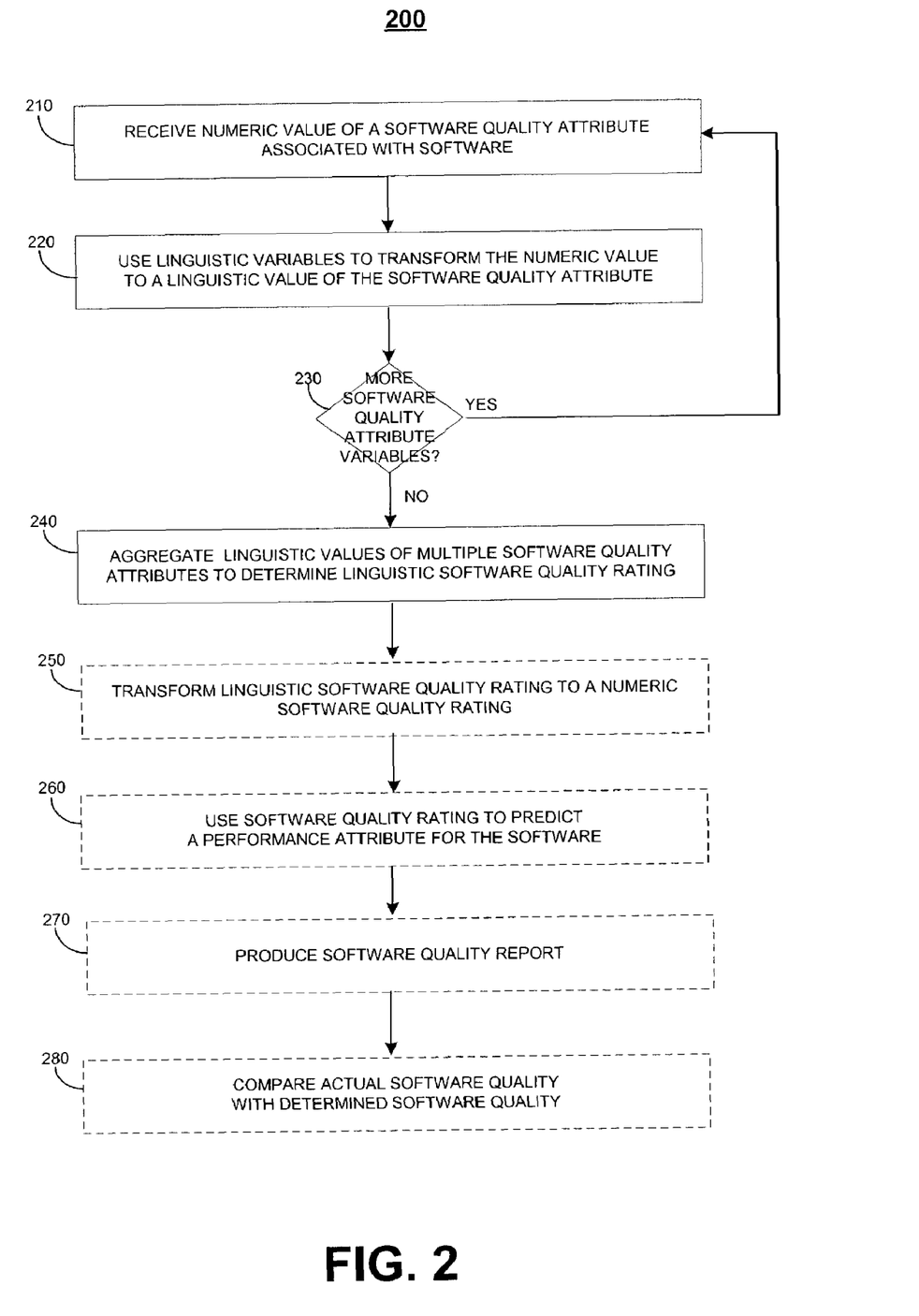
FIG. 2 is a flow chart of a process for determining the quality of software.

FIG. 2 depicts a process 200 for determining the quality of software. The process 200 may be performed at various stages during the software development process. For example, the process 200 may be performed when the design of the software is completed, when the software has been programmed and before the software has been tested, when testing the software is completed, and when the software is in production (e.g., when the software is operational and deployed). As the software is developed, tested and deployed, the process 200 may be repeated. The process 200 also may be repeated after the software is deployed and the software is in production. The process 200 may be performed by a processor, such as CPU 120 of FIG. 1.

In general, the process 200 uses fuzzy logic to model the uncertainty of software quality attributes for particular software. A numeric value for a software quality attribute is transformed into one of several possible linguistic values. By using a linguistic value rather than a numeric value to model the software quality attribute, the software quality attribute may be associated with a broader description and may be more likely to accurately represent the software quality attribute. A linguistic value for a software quality attribute may be associated with an indication of the degree of support (which also may be referred to as the degree of truth) to which the linguistic value accurately represents the software quality attribute of the software. Multiple software quality attributes are aggregated using rules to determine a linguistic quality rating for the software. The rules may include fuzzy logic operations. The use of fuzzy logic may permit a more accurate measurement of software quality by accounting for the uncertainty inherent in using imprecise quality attributes to measure software quality.

The process 200 begins when the processor receives a numeric value of a software quality attribute associated with software (step 210). For example, a user may enter a numeric value of a software quality attribute, or a numeric value of a software quality attribute may be received from another application program, such as a configuration management system or a performance management system. Examples of software quality attributes may include the complexity of the software, the amount of documentation associated with the software, the number of functions provided by the software, the degree of maintainability (e.g., an estimate of the ease of which the software can be changed), the degree of modularity, the number of hardware platforms on which the software operates, the reliability of the software (e.g., the mean time between failure), the percent of the software that can be reused, the size of the software (e.g., an estimate of the number of lines of executable code that make up the software), and the testability of the software (e.g., the number of units that have to be tested).

The processor then uses the linguistic variables to transform the numeric value to an appropriate linguistic value of the software quality attribute (step 220). Each software quality attribute is associated with more than one linguistic value. A linguistic value is a text term (which may be referred to as a linguistic term) for a software quality attribute, as opposed to a numeric value for the software quality attribute. Each linguistic value for a particular software quality attribute also is associated with a range of numeric values for the particular software quality attribute. The processor determines the appropriate linguistic value for the software quality attribute by determining which of several linguistic values corresponds to the numeric value received. For example, a linguistic value of "low" may be associated with a software quality attribute of complexity when the numeric value falls within a predetermined numeric range (e.g., 0 to 3, on a 10-point complexity scale). The linguistic value of "medium" may be associated with a software quality attribute of complexity when the numeric value falls within a second predetermined numeric range (e.g., more than 3 but less than 7, on a 10-point complexity scale). The linguistic value of "high" may be associated with a software quality attribute of complexity when the numeric value falls within a third predetermined numeric range (e.g., more than 7).

Figure 3:
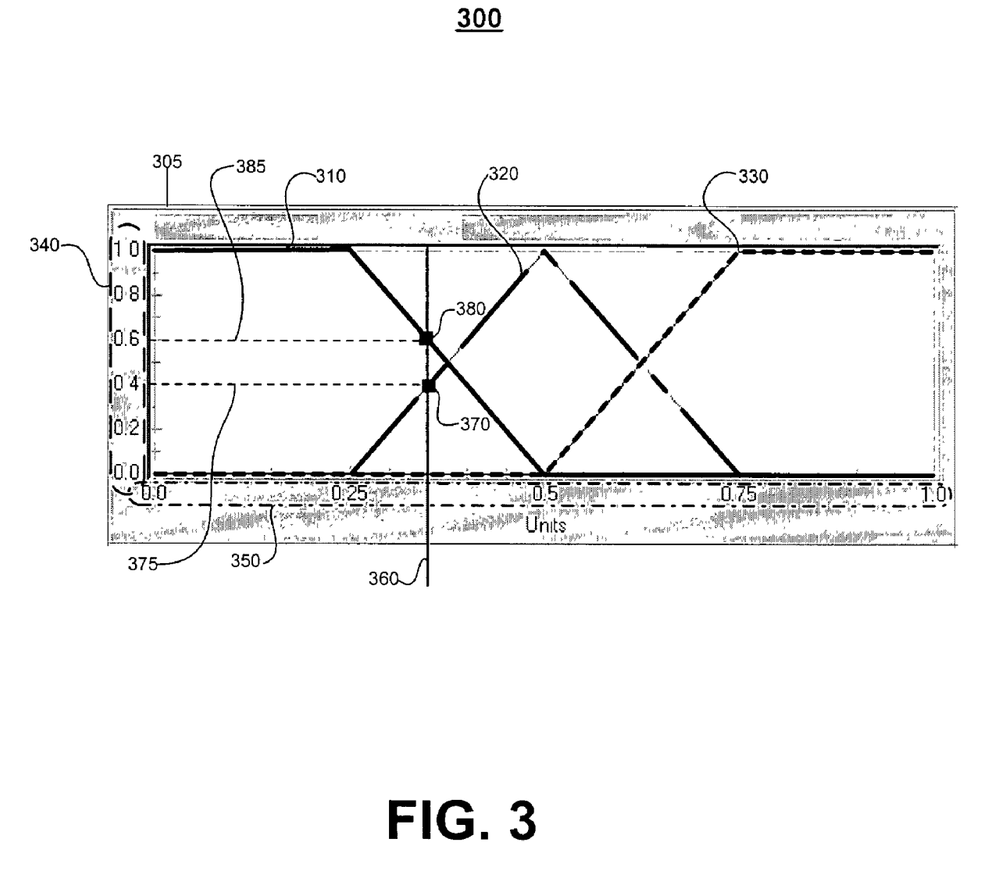
FIG. 3 is graph of a membership function used to determine the linguistic value for a quality attribute.

Referring also to FIG. 3, in some implementations, a linguistic value for a software quality attribute may be derived by using a membership function to the numeric value received. For example, a membership function 300 may be used to determine the linguistic value for complexity based on a numeric value for complexity. The membership function 300 includes a graph 305 having three linguistic functions 310, 320, and 330. Each linguistic function corresponds to a particular linguistic value for complexity: low 310, medium 320, and high 330. The membership function 300 of complexity indicates the degree of membership to which a particular numeric value corresponds for each of the three possible linguistic values. The degree of membership 340 of the numeric value (or element) in each linguistic value is represented on the y-axis using an interval from zero to one, with zero representing complete non-membership and one representing complete membership. The permitted numeric values 350 of complexity are represented on the x-axis.

As illustrated by the graph 305, the likelihood that a numeric value for complexity that is from 0 to 0.24998 represents low complexity is very high. Accordingly, a degree of membership of 1.0 (for complete membership) is assigned to the linguistic value of low for a received numeric value that is within the range from 0 to 0.24998. Similarly, the likelihood that a numeric value for complexity that is greater than 0.74996 represents high complexity is very high. Accordingly, a degree of membership of 1.0 (for complete membership) is assigned to the linguistic value of high for a received numeric value that is greater than 0.74996. When a received numeric value is 0.50, a degree of membership of 1.0 (for complete membership) is assigned to the linguistic value of medium.

When the received numeric value is more than 0.2499 and less than 0.49998, the membership function 300 identifies a partial degree of membership that the complexity is low, based on the low linguistic function 310, and another partial degree of membership that the complexity is medium, based on the medium linguistic function 320. For example, a numeric value of complexity of 0.35 is received, as indicated on the graph by line 360 that intersects the x-axis at 0.35 units. The line 360 intersects the medium function 320 at point 370, and a line 375 from the point 370 to the y-axis 340 intersects the y-axis 340 at 0.4. A degree of membership of 0.4 is associated with the medium linguistic value for complexity for the received numeric value of 0.35. Likewise, the line 360 intersects the low function 310 at point 380, and a line 385 from the point 380 to the y-axis 340 intersects the y-axis 340 at 0.6. A degree of membership of 0.6 is associated with the low linguistic value for complexity for the received numeric value of 0.35. Similarly, when the numeric value is more than 0.49998 and less than 0.74996, the membership function identifies a particular degree of membership that the complexity is medium and another degree of membership that the complexity is high.

In some implementations, more complex membership functions may be used. For example, a membership function for a single software quality attribute may be based on two numeric values for different software quality attributes.

The ability to use fuzzy logic or other probabilistic techniques in determining a linguistic value may be advantageous, particularly when software quality attributes are imprecise and/or when the evaluation of software quality attributes to form a conclusion about the quality of software is uncertain.

Figure 4:
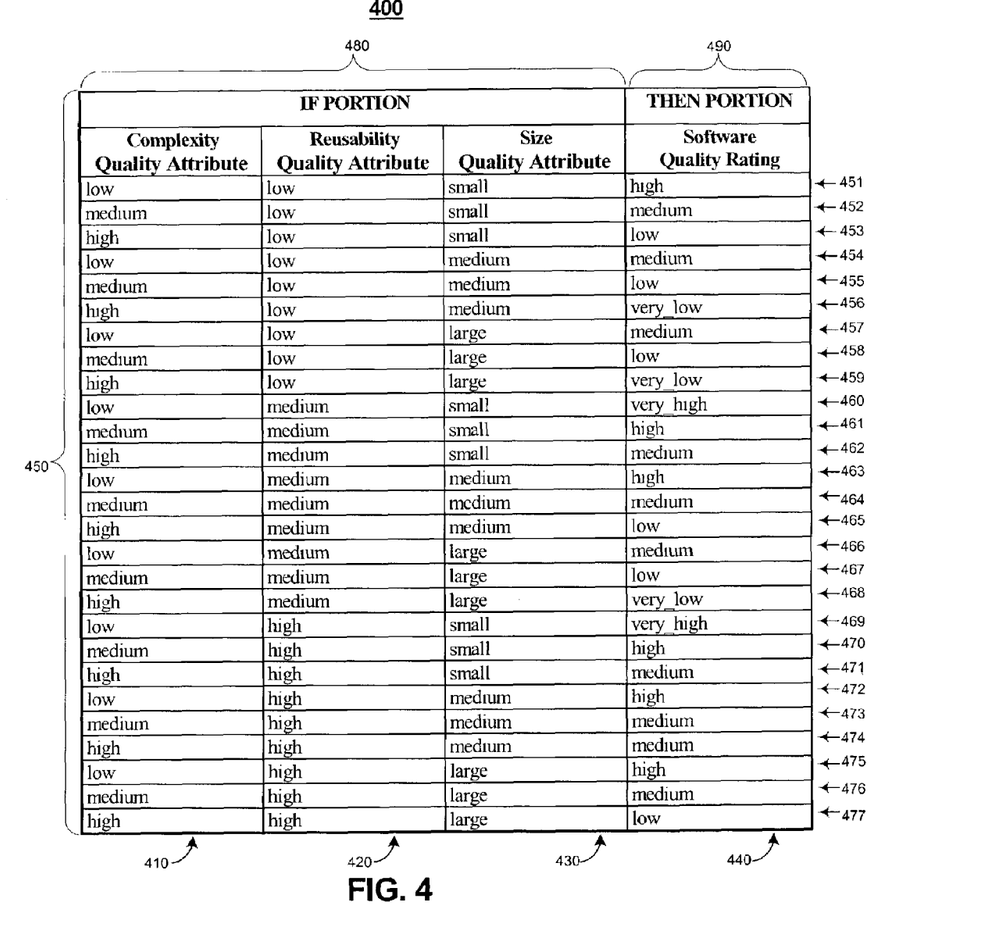
FIG. 4 is a block diagram of a data structure that identifies a software quality rating based on linguistic values associated with software quality attributes.

Referring again to FIG. 2, when additional software quality attribute variables are to be processed (step 230), the processor proceeds to access, or otherwise receive, another numeric value (step 210) as described previously. When no additional software quality attribute variables are to be processed (step 230), the processor aggregates the linguistic values of multiple software quality attributes to determine a linguistic software quality rating (step 240). For example, the process may access a table or other data structure that identifies a software quality rating based on the linguistic values of the software quality attributes included in the software quality rating, as illustrated in FIG. 4. The data structure 400 may be a table in a relational database management system. The data structure 400 may be used to aggregate the linguistic values of a complexity quality attribute 410, a reusability quality attribute 420, and a size quality attribute 430 to determine a software quality rating 440. The rule block 450 includes rows 451-477, with each row representing a particular rule for determining a software quality rating based on linguistic quality attribute values. For example, rule 451 indicates that a complexity quality attribute 410 of low, a reusability quality attribute 420 of low, and a size quality attribute 430 of small corresponds to a software quality rating 440 of high. Each of rules 451-477 includes an if-portion 480 and a then-portion 490. The if-portion 480 of a rule includes the quality attributes that are evaluated to determine the software quality rating 490. The then-portion includes the software quality rating 490 associated with the if-portion 480 of the rule.

Additionally or alternatively, when each quality attribute used in the rule is associated with a degree of membership, fuzzy logic operators, such as MIN-MAX, MIN-AVG and GAMMA, may be used to aggregate the degrees of membership to determine a degree of support for the software quality rating determined by the rule. The degree of support represents an estimate of the likelihood that the software quality rating accurately reflects the quality of the software. The degree of support also may be used to weigh each rule according to the importance of the particular rule relative to other rules in the rule block.

Additionally or alternatively, a default value of the software quality rating may be used if no rule matches the linguistic values of the quality attributes.

The processor may transform the linguistic software quality rating to a numeric software quality rating (step 250). This transformation may be referred to as defuzzification. Defuzzification may be performed using conventional approaches, such as using a center of maximum (CoM) or a center of area (CoA) approach to produce a best compromise result. Alternatively, a mean of maximum approach may be used to produce a most plausible result. The mean of maximum approach may be more likely to produce a more accurate measure of software quality.

The processor then may use the software quality rating to predict a performance attribute for the software (step 260). In some implementations, some or all of the software quality attributes also may be used with the software quality rating to determine a performance attribute. A software quality attribute used to determine the performance attribute may be referred to as a key quality attribute. A key quality attribute may be a composite software quality attribute that is composed of other software quality attributes, as may other types of software quality attributes. Example performance attributes include the efficiency of the software, the number of software change requests, reliability as measured by the mean time between failures, and overall quality. The prediction may be based on the performance of software with a similar quality ranking and similar quality attributes.

The processor may produce a software quality report (step 270). For example, a printed software quality report that identifies a numeric and/or a linguistic value for each software quality attribute may be produced.

When the software is put into production or is otherwise operational, the quality of the software may be compared with the determined software quality to help refine the process to determine software quality (step 280). The determined software quality used may be a performance attributed produced but also may be one or more of the software quality attributes, the linguistic software quality rating, or the numeric software quality rating. Information about software performance may be gathered. Performance information may include the changes to the developed software, and the timing, number and types of errors that occur in the software.

Performance information also may include efficiency of the software, as measured by the processing capacity required. The performance information may be compared with the predicted performance attributes and software quality information used to determine the software quality and predict software performance may be changed based on the comparison. For example, one or more rules in a rule block or a membership function for linguistic values for a software quality attribute may be modified.

Figure 5:
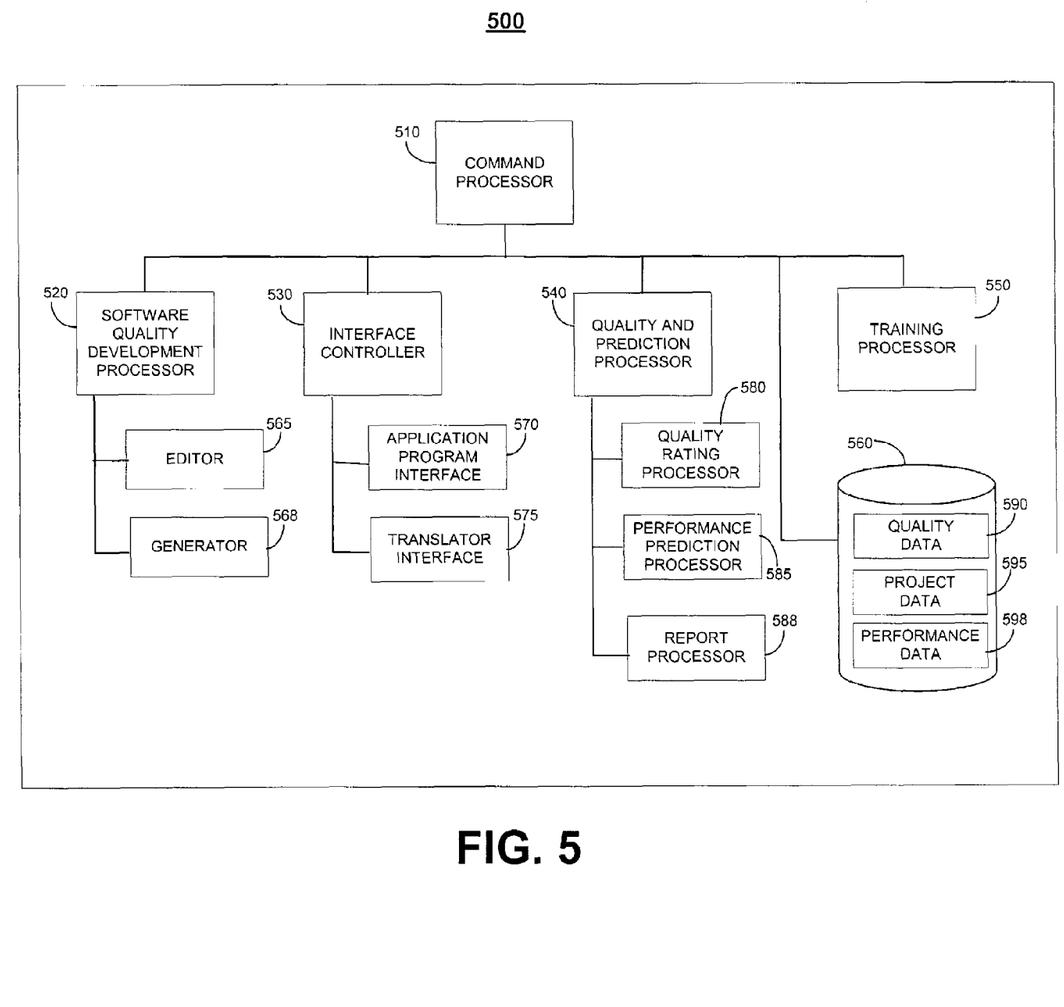
FIG. 5 is a block diagram of a software component architecture for determining the quality of software using fuzzy logic.

FIG. 5 illustrates a software component architecture 500 for determining the quality of software using fuzzy logic. The architecture 500 may be implemented, for example, using a fuzzy logic development system, such as fuzzyTECH by INFORM GmbH of Aachen, Germany, that allows a user to design a fuzzy logic system. The architecture 500 includes a command processor 510, a software quality development processor 520, an interface controller 530, a quality and prediction processor 540, and a training processor 550. The architecture 500 also includes a software quality assurance repository 560.

The command processor 510 provides a user interface for the system and is used to invoke the software quality development processor 520, the interface controller 530, the quality and prediction processor 540, and the training processor 550. For example, when initiated, the command processor 510 may display a menu with a selection that corresponds to the software quality development processor 520, the interface controller 530, the quality and prediction processor 540, and the training processor 550 from which the user selects. When the command processor 510 receives a selection from a user, the command processor 510 invokes the processor that corresponds to the selection received.

The software quality development processor 520 includes an editor 565 and a generator 568. The editor 565 is used to create, modify, and delete quality attributes and associated linguistic variables, rules, membership functions, and parameters that are stored in the software quality assurance repository 560. The generator is used to generate the components of the quality and prediction processor 540 based on the data included in the software quality assurance repository 560.

The interface controller 530 includes an application program interface 570 and a translator interface 575. The application program interface 570 (or API) allows data from a performance management system or a configuration management system to be communicated and stored in the software quality assurance repository 560. For example, data from one of several commercially available confirmation management systems may be stored in the software quality assurance repository 560 by using an appropriate API. Similarly, the translator interface 575 allows a user to send data from a source for which no corresponding API exists to the software quality assurance repository 560. In general, the translator interface 575 allows a user to specify which data structures in the software quality assurance repository 560 should receive the sent data. The ability to use an interface controller 530 to store data received from a file or other programmatic means in the software quality assurance repository 560 may improve accuracy by eliminating direct keying of data.

The quality and prediction processor 540 includes a quality rating processor 580, a performance prediction processor 585, and a report processor 588. The quality rating processor 580 receives one or more numeric values, with each numeric value being associated with a particular quality attribute. The quality rating processor 580 uses linguistic variables, rules, membership functions, and other types of fuzzy logic data from the software quality assurance repository 560 to determine a linguistic software quality ranking associated with the particular software. In some implementations, the quality rating processor 580 also may defuzzify the linguistic software quality ranking to determine a numeric software quality ranking.

The performance prediction processor 585 uses the quality ranking and/or some other quality attributes to predict one or more performance attributes of the software. The prediction is based on past performance of programs with a similar quality ranking and similar quality attributes. The performance prediction processor 584 may defuzzify the linguistic software quality ranking as necessary to produce a performance attribute.

The report processor 588 is used to report the quality rating and performance attributes produced. The report processor 588 also is used to produce comparisons reports that may be used to adjust quality attribute information in the software quality assurance repository 560.

The training processor 550 adjusts the quality attribute information in the software quality assurance repository 560 based on actual software quality or performance information. For example, the training processor 550 may modify quality attribute information based on actual performance data received from a performance management system or a configuration management system. Actual performance information may include change and failure information collected from the configuration management and performance analysis systems and stored in the software quality assurance repository 560 using the interface controller 530. The training processor 550 compares previous predictions with the actual results and adjusts the weighting factors and degrees of support associated with the linguistic variables and rules to reflect the new information.

In some implementations, the training processor 550 may use artificial neural network techniques. For example, the training processor 550 may use a modified back-propagation method of neural training to adjust the membership functions of the linguistic variables and the degree of support for the rules used by the quality rating processor 580 and the performance prediction processor 585.

The training processor 550 typically is invoked when actual quality information or actual performance information for software is received and stored in the software quality assurance repository 560. In some implementations, a trigger is set in the software quality assurance repository 560 to notify a user that the training processor 550 should be invoked. In some implementations, the training processor 550 may be automatically invoked without user intervention after performance data is received through the interface controller 530 and stored in the software quality assurance repository 560.

After the training processor 550 is run, the generator 568 is invoked to rebuild the quality rating processor 580 and the performance prediction processor 585 based on the results from the training processor 550. In some implementations, the generator may be invoked automatically without user intervention.

The software quality assurance repository 560 includes quality data 590, project data 595, and performance data 598. Quality data 590 includes data used by the quality and prediction processor 540 to determine software quality or predict a performance attribute for particular software. The quality data 590 may include, for example, quality attributes and associated membership functions or other data used to determine linguistic values for quality attribute. The quality data 590 also may include rules for determining a software quality rating based on one or more linguistic quality attributes. The quality data 590 may include information used to translate a linguistic value into a numeric value. The quality data 590 may include a predefined set of quality attributes and rules. The quality data 590 may be modified to meet individual needs using the editor 565.

The project information 595 includes identifying information, such as a project name and a description, for a particular software quality assurance project to determine the quality of a particular piece of software. The project information 595 may help organize more than one software quality determination project and identify a particular software quality determination project to process using software quality determination process. The project information 595 also includes the numeric value and linguistic values associated with each quality attribute used to measure the quality of the software. The project information 595 includes the linguistic and numeric software quality rating and any performance attributes determined. In some implementations, project information 595 for particular software may be associated with a version number so that more than one version of project information 595 may be associated with particular software.

The performance data 598 is used by the training processor 550 for tuning the quality and prediction processor 540. The performance data 598 may include performance information, such as failure data and change data, that is received through the interface controller 530.

Figure 6:
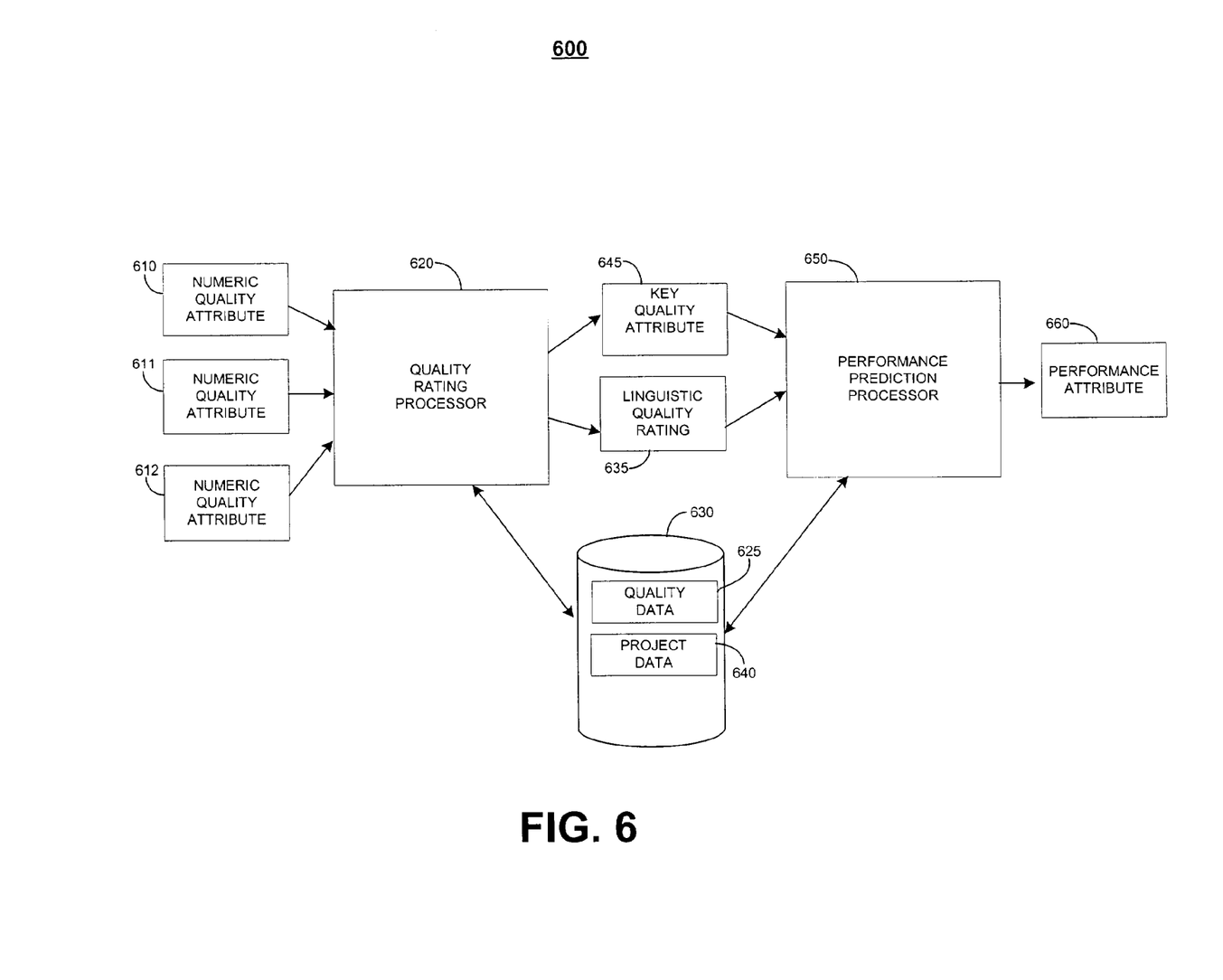
FIG. 6 is a block diagram of a process for determining the quality of software and predicting software performance.

FIG. 6 illustrates a process 600 to determine the quality of software and predict software performance, using architecture 500 of FIG. 5. Numeric quality attributes 610-612 are received by quality rating processor 620, such as quality rating processor 580 of FIG. 5. The quality rating processor 620 uses quality data 625 stored in a software quality assurance repository 630 to transform the numeric quality attributes 610-612 into linguistic quality attributes. The quality rating processor 620 uses the linguistic quality attributes to determine a linguistic quality rating 635 for the software. The linguistic quality rating 635 is stored in project data 640 of the software quality assurance repository 630, as are the numeric quality attributes 610-612 and the linguistic quality attributes.

The quality rating processor 620 sends the linguistic quality rating 635 and a key quality attribute 645 to the performance prediction processor 650, such as performance prediction processor 585 of FIG. 5. The key quality attribute 645 is one of the linguistic quality attributes generated by the quality rating processor 620.

The performance prediction processor 650 receives the linguistic quality rating 635 and the key quality attribute 645. Using quality data 625, the performance prediction processor 650 determines a performance attribute 660 based on the received linguistic quality rating 635 and the key quality attribute 645. The performance prediction processor 650 stores the performance attribute 660 in project data 640 of the software quality assurance repository 630.

Figure 7:
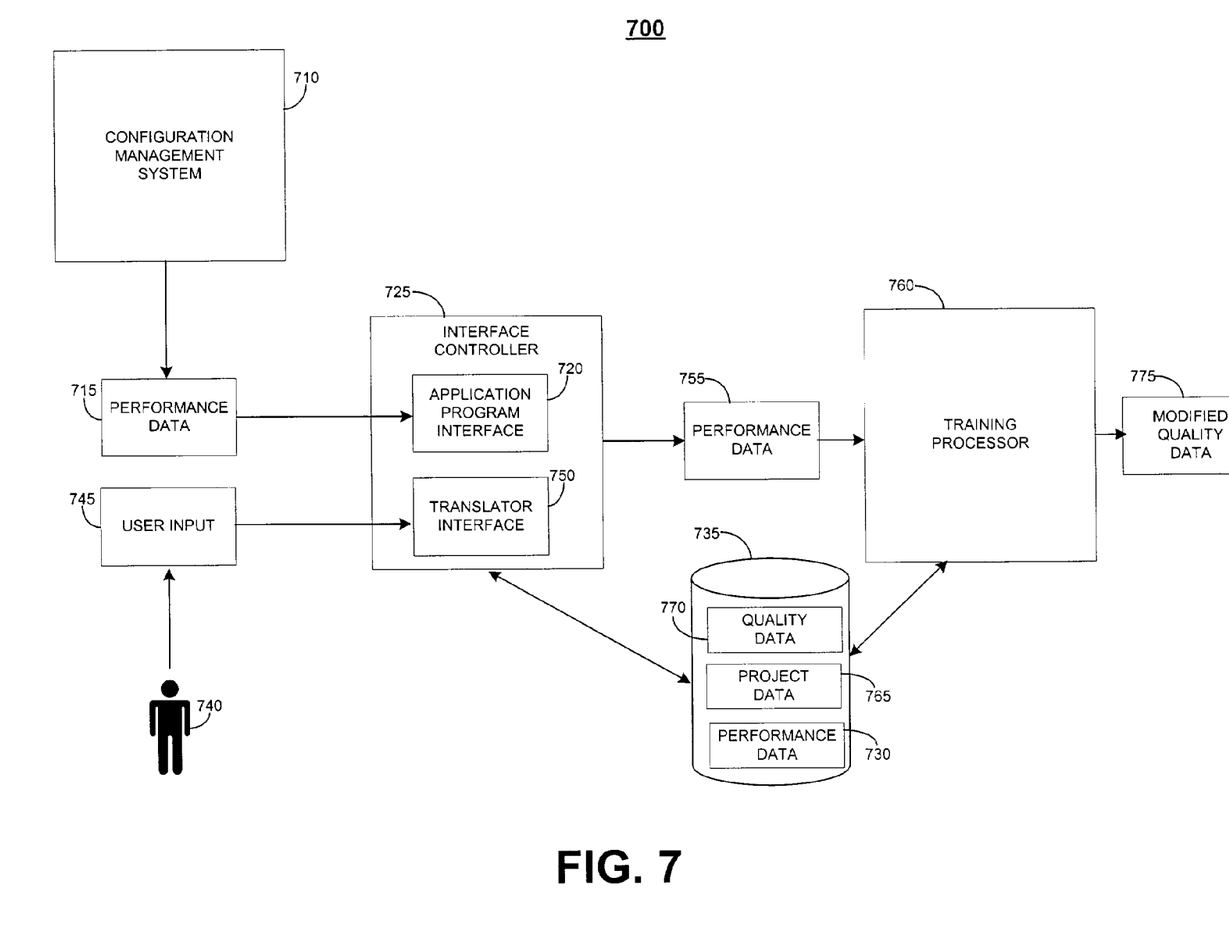
FIG. 7 is a block diagram of a process for updating the quality data used to determine the quality of software and predict the performance of software.

FIG. 7 depicts a process 700 to update the quality data used to determine the quality of software and predict the performance of software using architecture 500 of FIG. 5. A configuration management system 710 produces and sends performance data 715 to an application program interface 720 of an interface controller 725, such as application program interface 570 and interface controller 530 of FIG. 5. The application program interface 720 receives the performance data 715 and stores the performance data 715 in performance data 730 of a software quality assurance repository 735. The application program interface 720 is an interface developed to programmatically receive data from a particular configuration management system, transform the data as necessary, and store the data in the software quality assurance repository 735.

Similarly, a user 740 produces a user input 745 that is provided to a translator interface 750, such as translator interface 575 of FIG. 5, of interface controller 725. The translator interface 750 receives the user input 745, transforms the user input 745 as necessary, and stores the user input 745 in performance data 730.

The interface controller 725 accesses the performance data 730 and sends the newly received performance data 755 to the training processor 760, such as the training processor 550 of FIG. 5. In some implementations, the training processor may directly access the performance data 730 in the software quality assurance repository 735 rather than receiving the performance data 755 from the interface controller 725.

The training processor 760 receives (or accesses) the performance data 755. The training processor 760 compares the received performance data 755 to the predicted performance attributes and/or quality rating stored in project data 765, such as project data 595 of FIG. 5, of the software quality assurance repository 735. Based on the comparison, the training processor 760 modifies quality data 770, such as quality data 590 of FIG. 5, of the software quality assurance repository 735. The training processor 760 also produces a report that identifies the modified quality data 775.

Although the techniques have been described using a relational database management system, other data management techniques, including an object-oriented data management system and a series of XML (Extensible Markup Language) documents, may be used.

Implementations may include a method or process, an apparatus or system, or computer software on a computer medium. It will be understood that various modifications may be made. For example, the techniques described still could be used if steps of the disclosed techniques were performed in a different order and/or if components in the disclosed systems were combined in a different manner and/or replaced or supplemented by other components.

Other implementations are within the scope of the following claims.

What is claimed is:

1. A method for determining the quality of computer software, the method comprising:
   identifying a plurality of software attributes for evaluating a completed computer software;
   determining numeric values for each software quality attribute at different stages of software development prior to completion of the computer software, with each quality attribute based in part on a quality of different stages;
   transforming the numeric values to linguistic values, with each linguistic value being associated with the software quality attribute;
   aggregating the linguistic values to determine a linguistic software quality rating for the computer software, wherein the linguistic software quality rating predicts performance of the completed computer software in a production environment; and
   storing the predicted linguistic software quality rating in one or more files.

2. The method of claim 1 wherein transforming each numeric value comprises transforming at least one numeric value using a membership function that associates one of several linguistic values with a range of numeric values.

3. The method of claim 1 further comprising associating a degree of membership with at least one of the linguistic values.

4. The method of claim 3 further comprising associating a degree of support with the linguistic software quality rating based on the degree of membership associated with the at least one of the linguistic values.

5. The method of claim 1 further comprising transforming the linguistic software quality rating to a numeric software quality rating.

6. The method of claim 5 wherein transforming the linguistic software quality rating comprises transforming the linguistic software quality rating using a defuzzification a technique.

7. The method of claim 1 further comprising using the linguistic software quality rating to predict a performance attribute for the particular software.

8. The method of claim 1 wherein the transforming and the aggregating use stored quality data, the method further comprising:
storing the linguistic values, the linguistic software quality rating, and the performance attribute for the particular software;
receiving actual performance data for the particular software;
comparing the actual performance data with one or more of the stored the linguistic values, the linguistic software quality rating, and the performance attribute; and
modifying the stored quality data based on the comparison.

9. The method of claim 1 wherein the association of the linguistic values and the software quality attribute is user-modifiable.

10. A system for determining the quality of computer software, the system comprising a processor connected to a storage device and one or more input/output devices, wherein the processor:
identifies a plurality of software attributes for evaluating a completed computer software;
determines numeric values for each software quality attribute at different stages of software development prior to completion of the computer software, with each quality attribute based in part on a quality of different stages;
transforms the numeric values to linguistic values, with each linguistic value being associated with the software quality attribute;
aggregates the linguistic values to determine a linguistic software quality rating for the computer software, wherein the linguistic software quality rating predicts performance of the completed computer software in a production environment; and
stores the predicted linguistic software quality rating in one or more files.

11. The system of claim 10 wherein the processor further transforms at least one numeric value using a membership function that associates one of several linguistic values with a range of numeric values.

12. The system of claim 10 wherein the processor further transforms the linguistic software quality rating to a numeric software quality rating.

13. The system of claim 10 wherein the processor further uses the linguistic software quality rating to predict a performance attribute for the particular software.

14. The system of claim 10 wherein the processor further:
stores the linguistic values, the linguistic software quality rating, and the performance attribute for the particular software;
transforms and the aggregate using stored quality data;
receives actual performance data for the particular software;
compares the actual performance data with one or more of the stored the linguistic values, the linguistic software quality rating, and the performance attribute; and
modifies the stored quality data based on the comparison.

15. A computer-readable medium having embodied thereon a computer program that determines the quality of computer software, the medium comprising one or more code segments that:
identify a plurality of software attributes for evaluating a completed computer software;
determine numeric values for each software quality attribute at different stages of software development prior to completion of the computer software, with each quality attribute based in part on a quality of different stages;
transform the numeric values to linguistic values, with each linguistic value being associated with the software quality attribute;
aggregate the linguistic values to determine a linguistic software quality rating for the computer software, wherein the linguistic software quality rating predicts performance of the completed computer software in a production environment; and
store the predicted linguistic software quality rating in one or more files.

16. The medium of claim 15 wherein the one or more code segments transform each numeric value comprise one or more code segments that transform at least one numeric value using a membership function that associates one of several linguistic values with a range of numeric values.

17. The medium of claim 15 wherein the one or more code segments further transform the linguistic software quality rating to a numeric software quality rating.

18. The medium of claim 15 wherein the one or more code segments further use the linguistic software quality rating to predict a performance attribute for the particular software.

19. The medium of claim 15 wherein the one or more code segments:
store the linguistic values, the linguistic software quality rating, and the performance attribute for the particular software;
transform and the aggregate using stored quality data;
receive actual performance data for the particular software;
compare the actual performance data with one or more of the stored the linguistic values, the linguistic software quality rating, and the performance attribute; and
modify the stored quality data based on the comparison.

20. The method of claim 1, further comprising receiving an update to a design of the computer software in response to at least the predicted linguistic software quality rating.

* * * * *